United States Patent
Cui et al.

(10) Patent No.: US 11,629,008 B2
(45) Date of Patent: Apr. 18, 2023

(54) VERTICAL AUTOMATIC STORAGE CABINET

(71) Applicant: BEIJING ZHONGKE WENCHANG INTELLIGENT TECHNOLOGY CO., LTD., Beijing (CN)

(72) Inventors: Xuehai Cui, Beijing (CN); Gang Liu, Beijing (CN)

(73) Assignee: BEIJING ZHONGKE WENCHANG INTELLIGENT TECHNOLOGY CO, Beijing (CN)

( * ) Notice: Subject to any disclaimer, the term of this patent is extended or adjusted under 35 U.S.C. 154(b) by 0 days.

(21) Appl. No.: 17/536,178

(22) Filed: Nov. 29, 2021

(65) Prior Publication Data

US 2023/0031172 A1 Feb. 2, 2023

(30) Foreign Application Priority Data

Jul. 30, 2021 (CN) .......................... 202110878999.X

(51) Int. Cl.
| | |
|---|---|
| *B65G 1/12* | (2006.01) |
| *B65G 1/127* | (2006.01) |
| *A47B 57/08* | (2006.01) |
| *B65G 1/06* | (2006.01) |

(52) U.S. Cl.
CPC .............. *B65G 1/127* (2013.01); *A47B 57/08* (2013.01); *B65G 1/065* (2013.01)

(58) Field of Classification Search
CPC .............................. B65G 1/127; B65G 1/0492
See application file for complete search history.

(56) References Cited

U.S. PATENT DOCUMENTS

| | | | |
|---|---|---|---|
| 6,885,911 B1* | 4/2005 | Smith ................ | G11B 15/6835 700/214 |
| 9,020,632 B2* | 4/2015 | Naylor ................. | B65G 1/0492 414/277 |
| 9,266,675 B2* | 2/2016 | Yamashita ........... | B65G 1/0492 |
| 9,290,323 B2* | 3/2016 | Engle ..................... | B65G 1/127 |
| 10,399,773 B2* | 9/2019 | Grosse ................. | B65G 1/0457 |
| 10,457,483 B2* | 10/2019 | DeWitt ................. | B65G 1/137 |
| 10,633,186 B2* | 4/2020 | Valinsky .............. | B65G 1/0421 |
| 10,982,461 B2* | 4/2021 | Shinnaka ............. | B65G 1/0492 |
| 2008/0247848 A1* | 10/2008 | Freudelsperger .... | B65G 1/0492 414/277 |

* cited by examiner

*Primary Examiner* — Jonathan Snelting
(74) *Attorney, Agent, or Firm* — Miles & Stockbridge P.C.; Ajay Jagtiani

(57) ABSTRACT

The present invention relates to the technical field of vertical automatic storage cabinets and provides a vertical automatic storage cabinet that comprises: a cabinet body; storage racks; a grasping structure and a conveying structure. In the present vertical automatic storage cabinet, at least two storage racks are provided to be spaced apart in the height direction of the cabinet body, and the grasping structure is located in the area between the two storage racks. When in use, the storage boxes on both the upper and lower sides can be taken off the mounting rack, then can be transferred to the conveying structure, and the storage boxes can be conveyed to the outside of the cabinet body.

8 Claims, 7 Drawing Sheets

VERTICAL AUTOMATIC STORAGE CABINET

TECHNICAL FIELD

The present invention relates to the technical field of vertical automatic storage cabinets, and in particular relates to a vertical automatic storage cabinet.

BACKGROUND

As a type of intelligent storage device, automatic storage cabinets are widely used in daily life. According to functional details, vertical automatic storage cabinets can be generally categorized into data cabinets, dense cabinets, drawing cabinets, dressing cabinets, lockers, key cabinets, shoe cabinets and employee cabinets, etc.

An automatic storage cabinet in the prior art generally includes a cabinet body, a manipulator and storage racks provided in the cabinet body, wherein the cabinet body is divided into a storage space and a transportation space along the front-and-rear direction of the cabinet body. The manipulator is located in the rear transportation space, and the storage racks are located in the front storage space. The objects at different locations on the storage racks are taken by the movement of the manipulator. This design needs to sacrifice a lot of storage space in the cabinet body to serve as the transportation space of the manipulator, resulting in the decline of space utilization rate and practicability of the storage cabinet.

SUMMARY

Therefore, a technical problem to be solved by the present invention is how to overcome the defect in the prior art that the need for the storage cabinet to sacrifice a lot of storage space in the cabinet body to serve as the transportation space of the manipulator leads to the decline of space utilization rate and practicability of the storage cabinet, and how to provide a vertical automatic storage cabinet for this purpose.

To solve the above-mentioned technical problem, the technical solution of the present invention is as follows:

The present invention provides a vertical automatic storage cabinet that comprises: a cabinet body; storage racks, provided in parallel and spaced apart in the cabinet body, each of the storage racks extends along the horizontal direction, and the area between two adjacent upper and lower storage racks forms a first transportation space; a storage box, detachably provided on each of the storage racks; a grasping structure, being movable along a first direction in the first transportation space, and being configured to grasp the storage box; wherein the first direction is consistent with the extension direction of the storage racks; a conveying structure, being movable along a second direction in the cabinet body, and being configured to carry the storage box and convey the storage box into or out of the cabinet body; wherein the second direction is consistent with the height direction of the cabinet body.

Further, the grasping structure comprises a first guide rail, a first base, a first gripper and a second gripper; the first guide rail is provided along the first direction in the cabinet body, the first base is movable along the first direction on the first guide rail; the first gripper and the second gripper are both provided on the first base, wherein the first gripper is provided opposite to the second gripper, the first gripper and the second gripper are respectively configured to grasp a storage box on different sides of the first base.

Further, the grasping structure further comprises a first driving member, a second driving member and a third driving member; the connecting part of the first driving member is connected with the first base, and the action part of the first driving member is connected with the first guide rail and is configured to drive the first base to move; the connecting part of the second driving member is connected with the first base, and the action part of the second driving member is connected with the first gripper and is configured to drive the first gripper to move along the second direction; the connecting part of the third driving member is connected with the first base, and the action part of the third driving member is connected with the second gripper and is configured to drive the second gripper to move along the second direction.

Further, the conveying structure comprises a second guide rail, a second base and a stage; a preset gap is reserved between one end of each of the storage racks and an inner wall of the cabinet body to form a second transportation space, the second guide rail is provided in the second transportation space, and the second guide rail extends along the second direction; the second base is movable along the second direction on the second guide rail; the stage is provided on one side of the second base away from the second guide rail and is movable along a third direction; wherein the third direction is perpendicular to both the first direction and the second direction.

Further, the conveying structure further comprises a fourth driving member and a fifth driving member; the connecting part of the fourth driving member is connected with the inner wall of the cabinet body, and the action part of the fourth driving member is connected with the second base and is configured to drive the second base to move; the connecting part of the fifth driving member is connected with the second base, and the action part of the fifth driving member is connected with the stage and is configured to drive the stage to move along the third direction.

Further, the storage rack comprises a mounting plate and a support; the mounting plate is provided along the first direction, and the support is provided on one side of the mounting plate facing the grasping structure, one side of the storage box away from the grasping structure is provided with a first clamping joint pluggable to the support.

Further, each of the storage racks comprises two mounting plates provided in parallel and spaced apart, a plurality of the supports is provided on each of the mounting plates in a spaced apart manner, and the supports on the two mounting plates correspond to each other in a one-to-one manner.

Further, the other side of the storage box facing the grasping structure is provided with a second clamping joint; the ends of a first gripper and a second gripper away from a first base are both provided with a clamping slot configured to be engaged with the second clamping joint to pull the first clamping joint out of the support or to insert the first clamping joint into the support.

Further, the storage box comprises a box body and a shell; a first snap-fit body is provided on an outer wall of the box body, and a second snap-fit body is provided on an inner wall of the shell, the first snap-fit body is configured to be snap-fitted with the second snap-fit body, so that the box body is detachably arranged in the shell; the first clamping joint and the second clamping joint are both provided on an outer wall of the shell.

Further, a retrieval window is provided on one side surface of the cabinet body, and the side surface where the retrieval window is located is perpendicular to a third direction.

The technical solution of the present invention has the following advantages:

In the vertical automatic storage cabinet provided by the present invention, at least two storage racks are arranged to be spaced apart in the height direction of the cabinet body, and the grasping structure is located in the area between the two storage racks. When in use, the storage boxes on both the upper and lower sides can be taken off the mounting rack, then can be transferred to the conveying structure, and finally the storage boxes can be conveyed to the outside of the cabinet body by the conveying structure. When compared with the vertical automatic storage cabinets in the prior art, the thickness of the vertical automatic storage cabinet of the present invention is reduced, which facilitates reducing the occupied space; moreover, there is no need to sacrifice a lot of space in the cabinet body to operate the manipulator, which improves the space utilization rate and practicability of the cabinet body.

BRIEF DESCRIPTION OF THE DRAWINGS

In order to more clearly describe the technical solutions in the specific embodiments of the present invention or in the prior art, a brief introduction will be made hereinafter to the drawings needed to be used in the description of the specific embodiments or the prior art. Apparently, the drawings in the following description are some of the embodiments of the present invention. For a person skilled in the art, other drawings can be obtained based on these drawings without expenditure of creative labor.

Figure 1:
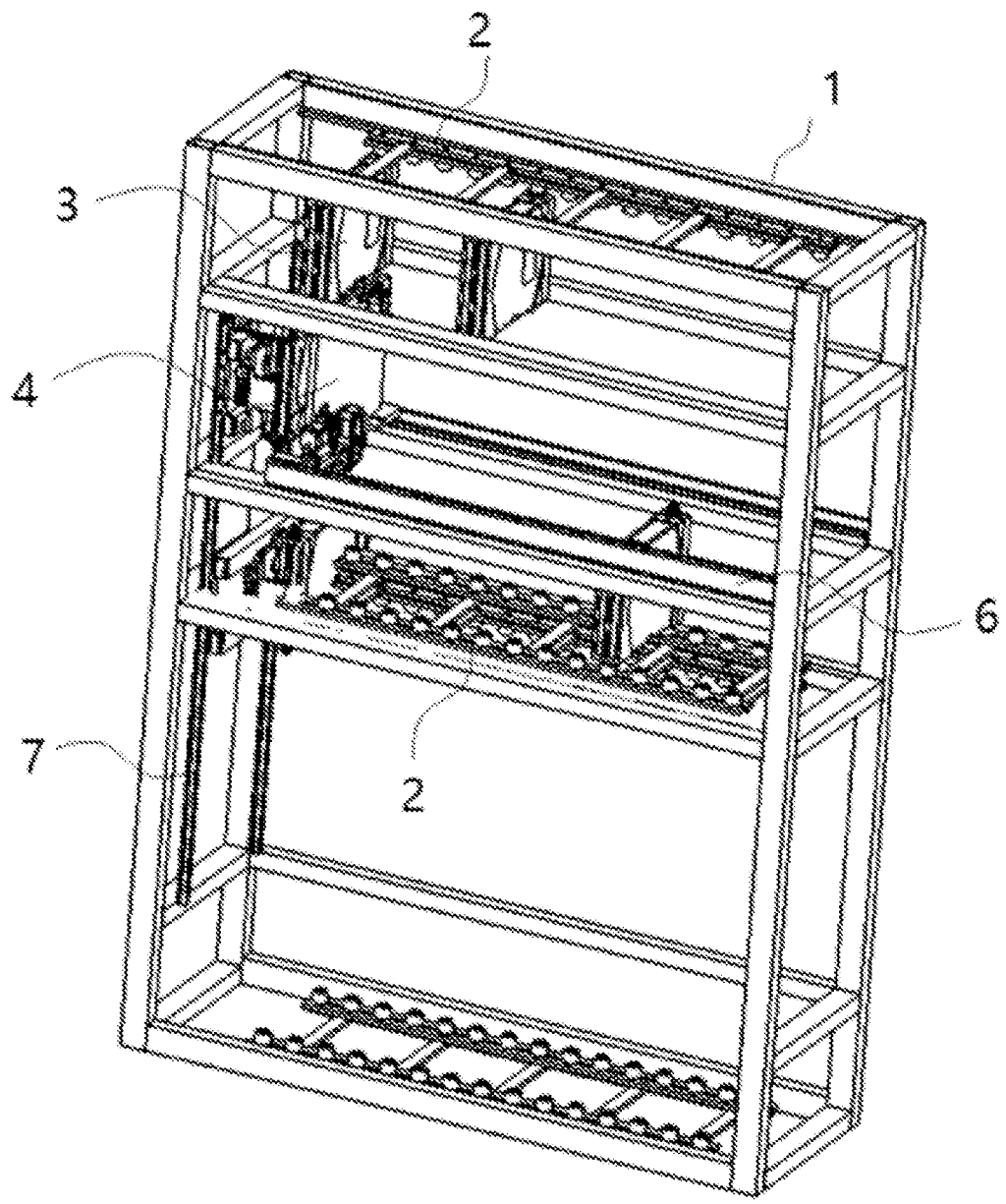
FIG. 1 is a structural schematic diagram of a vertical automatic storage cabinet in an embodiment of the present invention.

LIST OF REFERENCE SIGNS 1 cabinet body
2 storage rack
3 storage box
4 grasping structure
5 conveying structure
6 first guide rail
7 second guide rail
8 support
9 first base
10 supporting rod
11 second base
12 stage
13 first driving member
14 second driving member
15 third driving member
16 fourth driving member

DETAILED DESCRIPTION OF SPECIFIC EMBODIMENTS

The technical solutions of the present invention will be clearly and completely described below in conjunction with the appended drawings. Apparently, the described embodiments are part of the embodiments of the present invention, rather than all of the embodiments. Based on the embodiments described in the present invention, all other embodiments obtained by a person skilled in the art without expenditure of creative labor shall fall within the protection scope of the present invention.

In the description of the present invention, it should be noted that the orientation or positional relationship indicated by the terms "center", "upper", "lower", "left", "right", "vertical", "horizontal", "inner", "outer" and so on is based on the orientation or positional relationship shown in the appended drawings, and is only for the convenience of describing the present invention and simplifying the description, rather than indicates or implies that the indicated device or element must have a specific orientation or must be configured and operated in the specific orientation, therefore it cannot be interpreted as a limitation of the present invention. In addition, the terms "first", "second", and "third" are only used for descriptive purposes, and cannot be interpreted as indicating or implying relative importance.

In the description of the present invention, it should be noted that, unless clearly specified and defined otherwise, the terms "mounted", "interconnected" or "connected" should be understood in a broad sense, for example, it may be a fixed connection, a detachable connection or an integral connection; it may be a mechanical connection or an electrical connection; it may be a direct connection, or it may be an indirect connection through an intermediate medium, or it may be an internal communication between two elements. For an ordinary person skilled in the art, the specific meanings of the above-mentioned terms in the present invention may be understood in accordance with the specific context thereof.

In addition, the technical features involved in the different embodiments of the present invention described below may be combined with each other as long as they do not conflict with each other.

Figure 2:
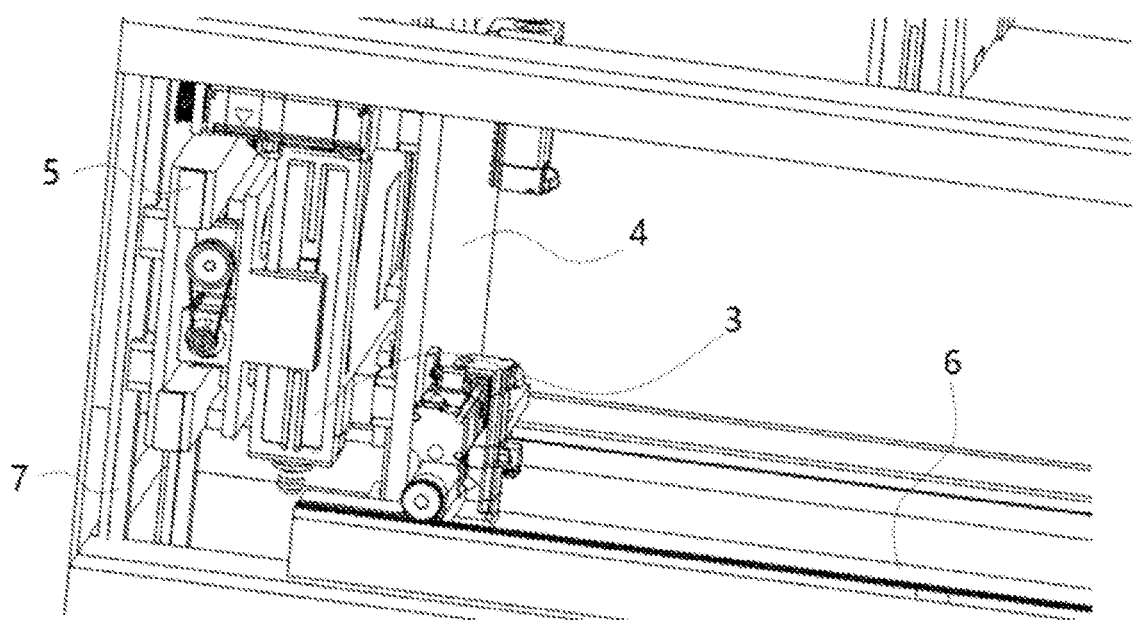
FIG. 2 is a local structural enlarged schematic diagram at the grasping structure in the vertical automatic storage cabinet in the embodiment of the present invention.

FIG. 1 is a structural schematic diagram of a vertical automatic storage cabinet in an embodiment of the present invention; FIG. 2 is a local structural enlarged schematic diagram at the grasping structure in the vertical automatic storage cabinet in the embodiment of the present invention; as shown in FIGS. 1 and 2, the present embodiment provides a vertical automatic storage cabinet that comprises: a cabinet body 1; storage racks 2, provided in parallel and spaced apart in the cabinet body 1, each of the storage racks 2 extends along the horizontal direction, and the area between two adjacent upper and lower storage racks 2 forms a first transportation space; a storage box 3, detachably provided on each of the storage racks 2; a grasping structure 4, being movable along a first direction in the first transportation space, and being configured to grasp the storage box 3; wherein the first direction is consistent with the extension direction of the storage racks 2; a conveying structure 5, being movable along a second direction in the cabinet body 1, and being configured to carry the storage box 3 and convey the storage box 3 into or out of the cabinet body 1; wherein the second direction is consistent with the height direction of the cabinet body 1.

Specifically, the cabinet body 1 may be a cabinet body 1 with a cuboid structure, and the interior of the cabinet body 1 is hollow. Wherein, a plurality of storage racks 2 may be provided to be spaced apart in the height direction of the cabinet body 1. For example, two storage racks 2 may be provided from top to bottom, and the area between the two storage racks 2 forms a first transportation space for installing the grasping structure 4. For example, when the height of the cabinet body 1 is high, four storage racks 2 may be provided from top to bottom. Correspondingly, two grasping structures 4 need to be provided. Wherein, the storage racks 2 may be fixed on the inner walls of the cabinet body 1 by bolts.

Wherein, a plurality of storage boxes 3 are provided at intervals from left to right along the extension direction of the storage rack 2, and a certain interval is reserved between every two adjacent storage boxes 3. The size of the interval may be designed as needed to facilitate being taken by the grasping structure 4.

Wherein, the grasping structure 4 may be moved upwards or downwards, and may also be translated to the left or to the right, which facilitates taking the storage boxes 3 on both the upper and lower sides and transferring them onto the conveying structure 5.

Wherein, the conveying structure 5 is located inside the cabinet body 1, for example on the leftmost side in the cabinet body 1. The conveying structure 5 may be moved upwards or downwards, and may also be moved back and forth, so as to transfer the storage box 3 to the outside of the cabinet body 1, or to take the storage box 3 from the outside of the cabinet body 1 and place it onto one of the storage racks 2 at different heights. With this arrangement, the thickness of the cabinet body 1 can be slightly larger than the size of the storage box 3, and there is no need to reserve a running space for the grasping structure 4 and the conveying structure 5 at the rear, which is beneficial for reducing the volume of the cabinet 1 and improve the space utilization rate in the cabinet body 1.

In the vertical automatic storage cabinet provided by the present invention, at least two storage racks 2 are arranged to be spaced apart in the height direction of the cabinet body 1, and the grasping structure 4 is located in the area between the two storage racks 2. When in use, the storage boxes 3 on both the upper and lower sides can be taken off the mounting rack 3, then can be transferred to the conveying structure 5, and finally the storage boxes 3 can be conveyed to the outside of the cabinet body 1 by the conveying structure 5. When compared with the vertical automatic storage cabinets in the prior art, the thickness of the vertical automatic storage cabinet of the present invention is reduced, which facilitates reducing the occupied space; moreover, there is no need to sacrifice a lot of space in the cabinet body 1 to operate the manipulator, which improves the space utilization rate and practicability of the cabinet body 1.

Figure 4:
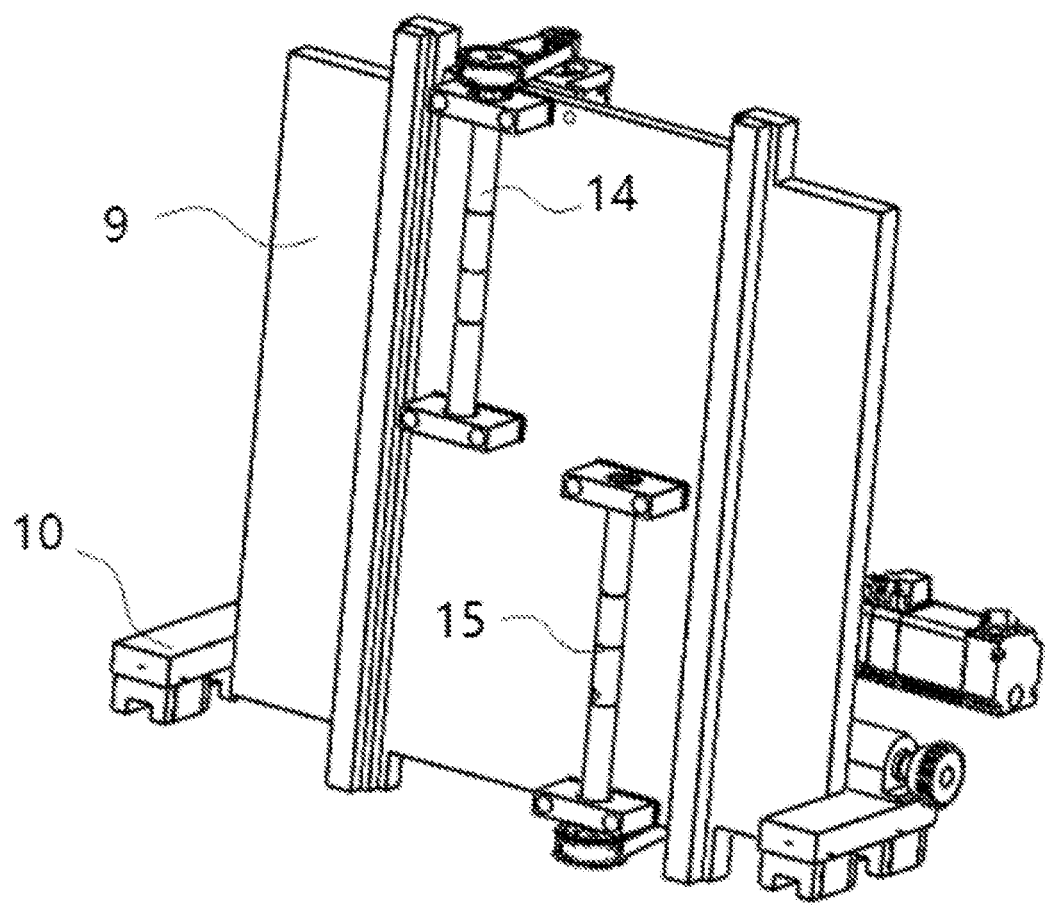
FIG. 4 is a (front) schematic diagram of the grasping structure in the vertical automatic storage cabinet in the embodiment of the present invention.
Figure 5:
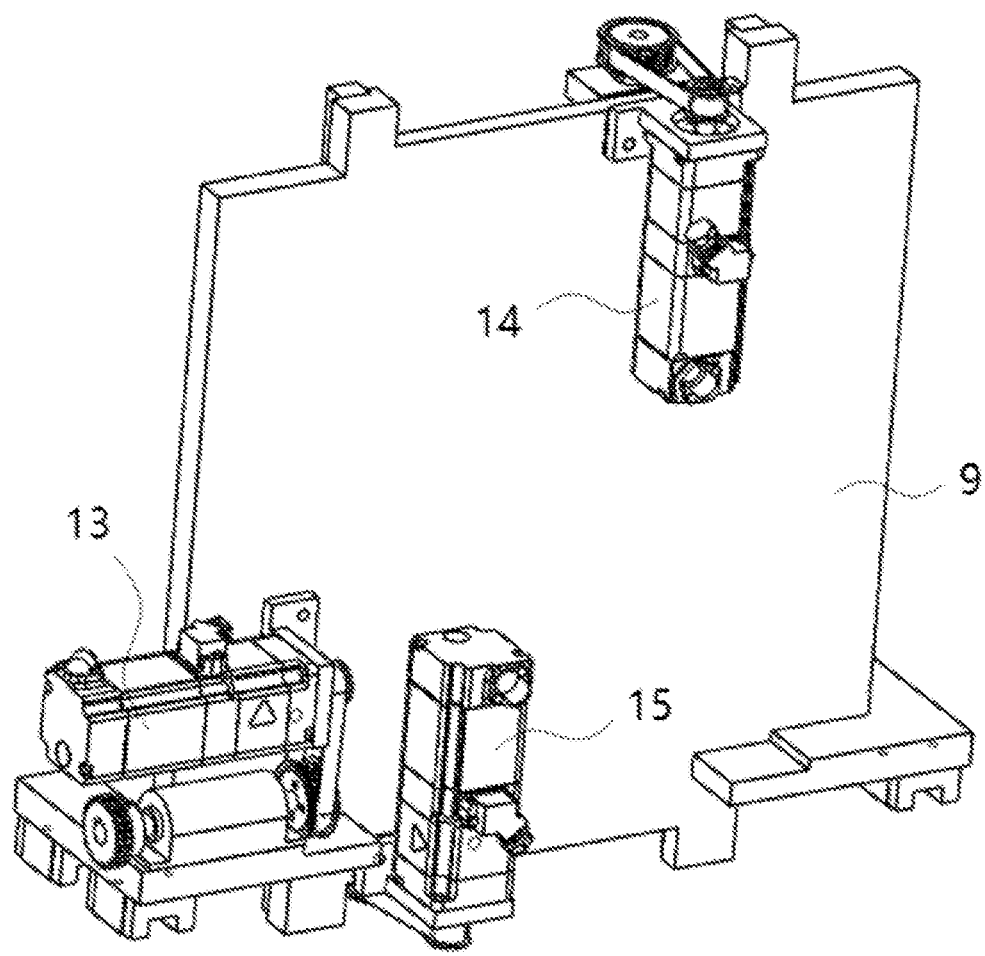
FIG. 5 is a (rear) schematic diagram of the grasping structure in the vertical automatic storage cabinet in the embodiment of the present invention.

FIG. 4 is a (front) schematic diagram of the grasping structure in the vertical automatic storage cabinet in the embodiment of the present invention; FIG. 5 is a (rear) schematic diagram of the grasping structure in the vertical automatic storage cabinet in the embodiment of the present invention; as shown in FIGS. 4 and 5, in the present embodiment, the grasping structure 4 comprises a first guide rail 6, a first base 9, a first gripper and a second gripper; the first guide rail 6 is provided along the first direction in the cabinet body 1, the first base 9 is movable along the first direction on the first guide rail 6; the first gripper and the second gripper are both provided on the first base 9, wherein the first gripper is provided opposite to the second gripper, the first gripper and the second gripper are respectively configured to grasp a storage box 3 on different sides of the first base 9.

Wherein, both ends of the first guide rail 6 may be respectively welded to be connected with an inner wall of the cabinet body 1. For example, in order to make the first base 9 run more smoothly, two first guide rails 6 may be provided in parallel and spaced apart. Wherein, the first base 9 may include a flat plate and two supporting rods 10, the two supporting rods 10 are located at the bottom side of the flat plate and clamp the flat plate in the middle, the plate surfaces of the flat plate are provided vertically and perpendicular to the first direction. Both ends of the supporting rod 10 may extend beyond the flat plate along the second direction, so as to temporarily store the storage box 3 using the extended part of the supporting rod 10 together with the flat plate. A plurality of sliding blocks may be welded on the bottom surface of the supporting rod 10, and the sliding blocks may be slidably connected with the first guide rail 6 so that the first base 9 may move left and right along the first guide rail 6.

Wherein, the first gripper and the second gripper may be located on the same plate surface of the flat plate, or may be provided on two different plate surfaces of the flat plate respectively. For example, the first gripper is responsible for grasping the storage box 3 from a position above the flat plate, and the second gripper is responsible for grasping the storage box 3 from a position below the flat plate.

In the present embodiment, the grasping structure 4 further comprises a first driving member 13, a second driving member 14 and a third driving member 15; the connecting part of the first driving member 13 is connected with the first base 9, and the action part of the first driving member 13 is connected with the first guide rail 6 and is configured to drive the first base 9 to move. Wherein, the first driving member 13 may comprise a motor, a gear wheel and a gear rack; the motor may be installed on the first base 9 through bolts, the gear wheel is sleeved on the output shaft of the motor, the gear rack is provided in the cabinet body 1 and arranged along a direction parallel to the first guide rail 6, both ends of the gear rack are welded to be connected with an inner wall of the cabinet body 1, and the gear wheel is meshed with the gear rack. When the motor rotates, the first base 9 may move left and right along the first direction under the action of the gear wheel and the gear rack.

In the present embodiment, the connecting part of the second driving member 14 is connected with the first base 9, and the action part of the second driving member 14 is connected with the first gripper and is configured to drive the first gripper to move along the second direction; wherein, the second driving member 14 may be a telescopic cylinder. Wherein, the second driving member 14 may also comprise a motor, a screw rod and a nut. the motor may be installed on the first base 9 through bolts, the screw rod and the output shaft of the motor may be connected to each other through a coupling or may be connected to each other through a belt and a belt pulley, and the screw rod extends along the second direction. The nut may be welded to be connected with the first gripper, and the nut is sleeved on the screw rod, so that, when the motor rotates, the first gripper may be moved upwards or downwards.

In the present embodiment, the connecting part of the third driving member 15 is connected with the first base 9, and the action part of the third driving member 15 is connected with the second gripper and is configured to drive the second gripper to move along the second direction. Wherein, the third driving member 15 may be a telescopic cylinder. Wherein, the third driving member 15 may also comprise a motor, a screw rod and a nut. the motor may be installed on the first base 9 through bolts, the screw rod and the output shaft of the motor may be connected to each other through a coupling or may be connected to each other through a belt and a belt pulley, and the screw rod extends along the second direction. The nut may be welded to be connected with the second gripper, and the nut is sleeved on the screw, so that, when the motor rotates, the second gripper may be moved upwards or downwards.

Figure 3:
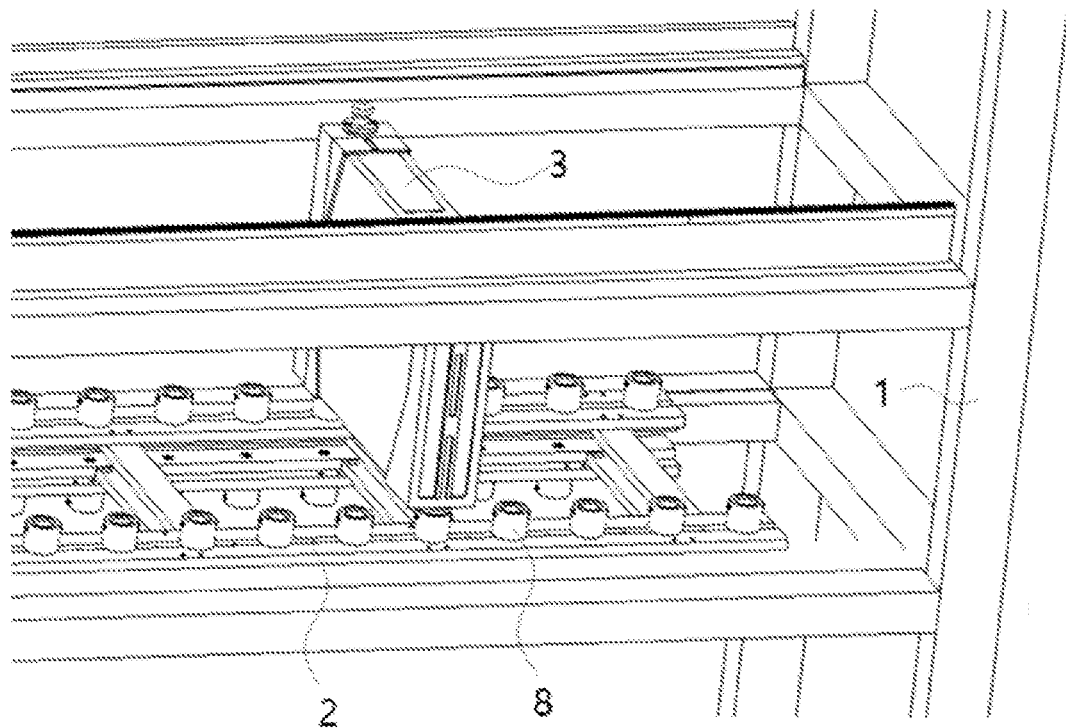
FIG. 3 is a local structural enlarged schematic diagram at the storage racks in the vertical automatic storage cabinet in the embodiment of the present invention.

FIG. 3 is a local structural enlarged schematic diagram at the storage racks in the vertical automatic storage cabinet in the embodiment of the present invention; as shown in FIG. 3, in the present embodiment, the storage rack 2 comprises a mounting plate and a support 8; the mounting plate is provided along the first direction, and the support 8 is provided on one side of the mounting plate facing the grasping structure 4; one side of the storage box 3 away from the grasping structure 4 is provided with a first clamping joint pluggable to the support 8.

For example, each of the storage racks 2 comprises two mounting plates provided in parallel and spaced apart, a plurality of the supports 8 is provided on each of the mounting plates in a spaced apart manner, and the supports 8 on the two mounting plates correspond to each other in a one-to-one manner.

For example, the other side of the storage box 3 facing the grasping structure 4 is provided with a second clamping joint; the ends of a first gripper and a second gripper away from a first base 9 are both provided with a clamping slot configured to be engaged with the second clamping joint to pull the first clamping joint out of the support 8 or to insert the first clamping joint into the support 8.

For example, the structure of the first clamping joint and the second clamping joint may be the same to improve the universality of the storage box 3. For example, the first clamping joint may be installed on the housing by screws. Wherein, the first clamping joint may be a structure with two large ends and small middle. For example, one end of the first clamping joint away from the housing may be a spherical structure, and other end close to the housing may be a circular plate. Wherein, the support 8 may be a cylindrical structure, and one end of the support 8 opposite to the mounting plate is an open structure for inserting the first clamping joint. When in use, one end of the first clamping joint with spherical structure may be inserted into the support 8.

Wherein, the structure of the first clamping joint and the structure of the second clamping joint may be identical to improve the versatility of the storage box 3. For example, the first clamping joint may be installed on the shell by screw bolts. Wherein, the first clamping joint may be a structure with two larger ends and a smaller middle part. For example, one end of the first clamping joint away from the shell may be a spherical structure, and the other end thereof adjacent to the shell may be a circular plate. Wherein, the support 8 may have a cylindrical structure, and the end of the support 8 facing away from the mounting plate has an open structure for inserting the first clamping joint therein. When in use, the end of the first clamping joint having the spherical structure may be inserted into the support 8.

Wherein, the first gripper may be an L-shaped plate, the vertical segment of the L-shaped plate is welded to be connected with the nut, the horizontal segment of the L-shaped plate is parallel to the first guide rail 6, and two clamping slots may be provided in a front position and a rear position, respectively, so as to be spaced apart on the horizontal segment of the L-shaped plate. Taking the storage box 3 above the first base 9 as an example, when it is necessary to remove this storage box 3, firstly the first base 9 is moved directly under the storage box 3, the second gripper is raised by the third driving member 15 at this time, and then, after the height of the clamping slots becomes aligned with the height of the second clamping joint, the first base 9 is moved in the second direction, so that the clamping slots may clamp the part between the circular plate and the spherical structure, and then the second gripper is lowered by the third driving member 15, so that the first clamping joint is pulled out from the support 8, the lowering of the second gripper continues until the storage box 3 is placed on the two support rods 10, and the first base 9 is moved at this time to transfer the storage box 3 to the conveying structure 5.

In the present embodiment, the storage box 3 comprises a box body and a shell; a first snap-fit body is provided on an outer wall of the box body, and a second snap-fit body is provided on an inner wall of the shell, the first snap-fit body is configured to be snap-fitted with the second snap-fit body, so that the box body is detachably arranged in the shell; the first clamping joint and the second clamping joint are both provided on an outer wall of the shell.

For example, the shell and the box body may have a structure similar to that of a drawer, and the box body may be drawn out of the shell. For example, the first snap-fit body and the second snap-fit body may be magnets with opposite polarities. The first snap-fit body may be adhesively bonded to the box body, and the second snap-fit body may be adhesively bonded to the shell.

Figure 6:
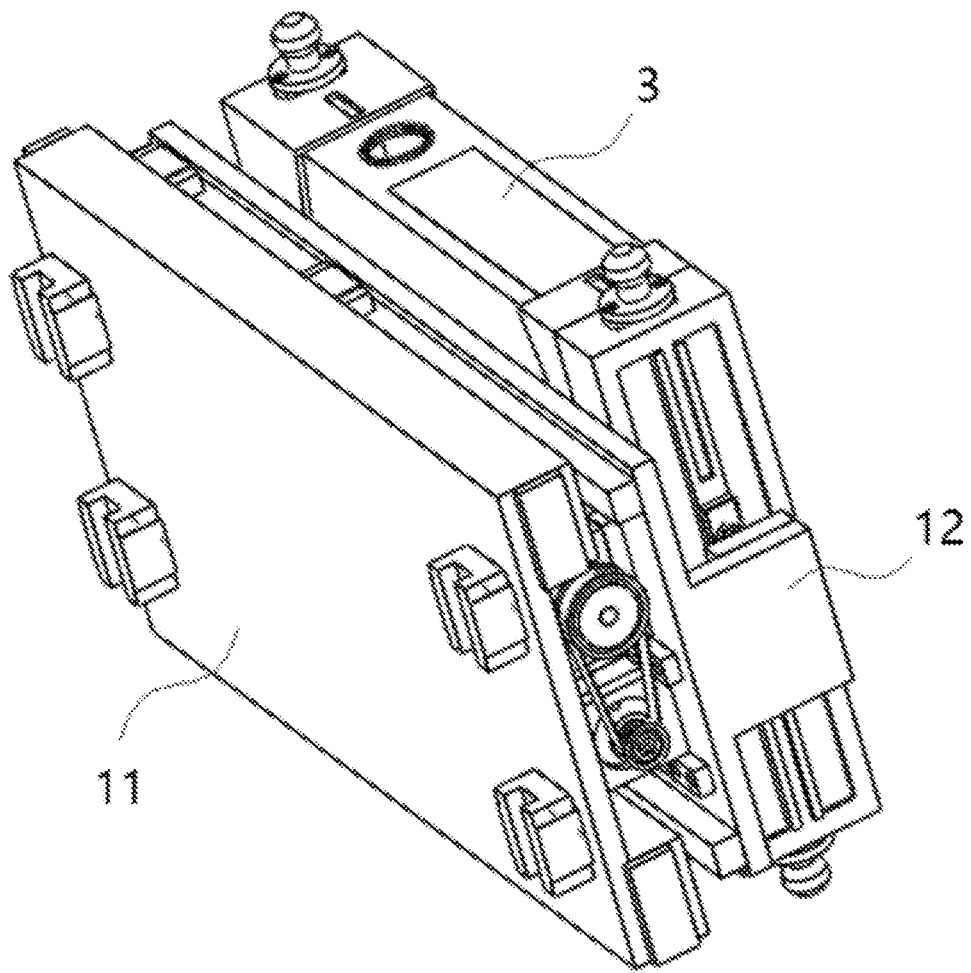
FIG. 6 is a schematic diagram of the conveying structure (with a storage box) in the vertical automatic storage cabinet in the embodiment of the present invention.
Figure 7:
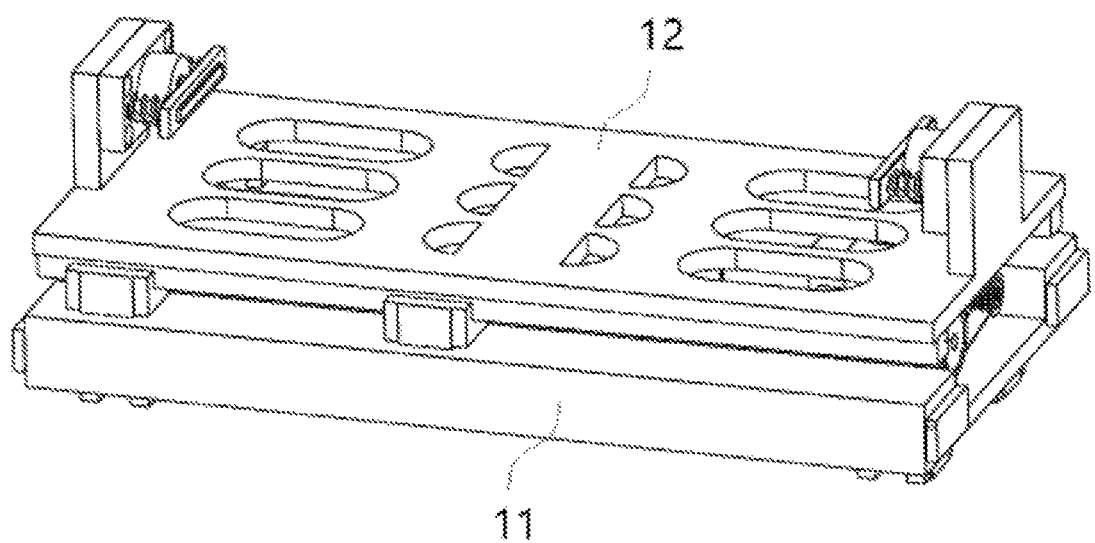
FIG. 7 is a schematic diagram of the conveying structure (without a storage box) in the vertical automatic storage cabinet in the embodiment of the present invention.

FIG. 6 is a schematic diagram of the conveying structure (with a storage box) in the vertical automatic storage cabinet in the embodiment of the present invention; FIG. 7 is a schematic diagram of the conveying structure (without a storage box) in the vertical automatic storage cabinet in the embodiment of the present invention; as shown in FIGS. 6 and 7, in the present embodiment, the conveying structure 5 comprises a second guide rail 7, a second base 11 and a stage 12; a preset gap is reserved between one end of each of the storage racks 2 and an inner wall of the cabinet body 1 to form a second transportation space, the second guide rail 7 is provided in the second transportation space, and the second guide rail 7 extends along the second direction; the second base 11 is movable along the second direction on the second guide rail 7.

For example, both ends of the second guide rail 7 may be welded on the top and bottom surfaces of the cabinet body 1 respectively. A plurality of sliding blocks may be provided on one side of the second base 11 facing the second guide rail 7 to reduce the friction between the second base 11 and the second guide rail 7. Wherein, two second guide rails 7 may be arranged in parallel and spaced apart to improve the stability of the movement of the second base 11.

In the present embodiment, the connecting part of the fourth driving member (not shown in the drawings) is connected with the inner wall of the cabinet body 1, and the action part of the fourth driving member is connected with the second base 11 and is configured to drive the second base 11 to move.

For example, the fourth driving member may comprise a motor and a belt, or may comprise a motor, a screw rod and a nut. Taking the fourth driving member comprising a motor and a belt as an example to describe, for example, the motor may be provided on the top surface of the cabinet body 1, a rotating shaft may be provided at a corresponding position on the bottom surface of the cabinet body 1, the belt is wound on an output shaft of the motor and the rotating shaft, and the belt may be driven to rotate when the motor rotates. At the same time, a connector is provided on one side of the second base 11 adjacent to the belt and the connector is fixedly connected with the belt and may move synchronously with the belt, so that ultimately the second base 11 is driven to move up and down via the connector.

In the present embodiment, the stage 12 is provided on one side of the second base 11 away from the second guide rail 7 and is movable along a third direction relative to the second base 11; wherein the third direction is perpendicular to both the first direction and the second direction. For example, the stage 12 may be mounted on the second base 11 through a slider block and a slide rail.

For example, the stage 12 may be a U-shaped structure for clamping the storage box 3. Wherein, electromagnets may be provided on the two side walls of the U-shaped structure, and iron parts are provided at corresponding positions on outer walls of the shell of the storage box 3. When the storage box 3 is transferred onto the stage 12, the electromagnets are energized and attract the iron parts, so that the storage box 3 can be fixed on the stage 12 to prevent the storage box 3 from falling off the stage 12 during the transfer process.

Figure 8:
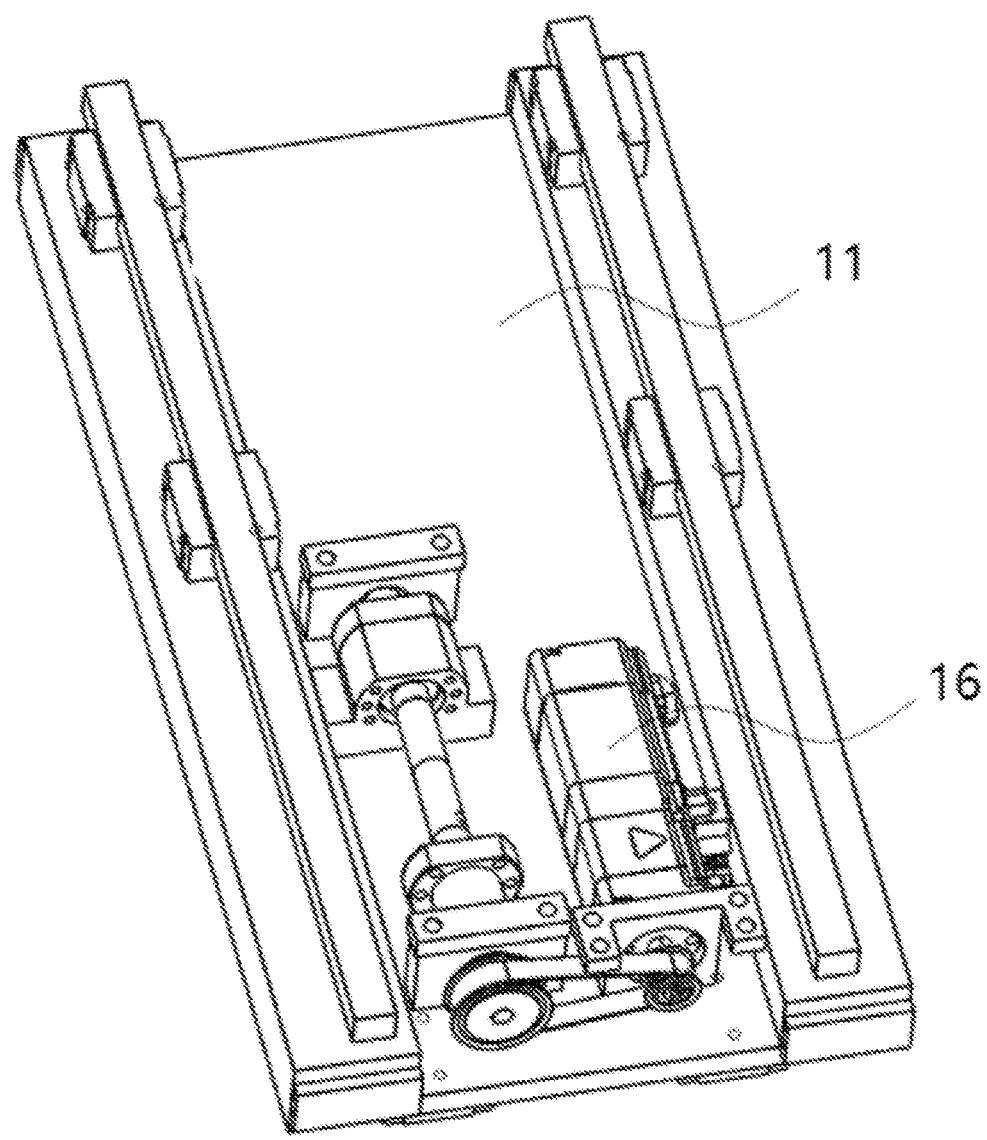
FIG. 8 is a local structural schematic diagram of the conveying structure in the vertical automatic storage cabinet in the embodiment of the present invention.

FIG. 8 is a local structural schematic diagram of the conveying structure in the vertical automatic storage cabinet in the embodiment of the present invention, as shown in FIG. 8, in the present embodiment, the connecting part of the fifth driving member 16 is connected with the second base 11, and the action part of the fifth driving member 16 is connected with the stage 12 and is configured to drive the stage 12 to move along the third direction.

For example, the fifth driving member 16 may include a motor, a screw rod and a nut. For example, the motor may be installed on one side of the stage 12 facing the second base 11 through a bolt, the motor and the output shaft thereof may be connected to the screw rod through a coupling, the nut is sleeved on the screw, and the nut may be welded on one side of the second base 11 facing the stage 12, so that, when the motor rotates, the stage 12 may be driven to move back and forth relative to the second base 11.

In the present embodiment, a retrieval window is provided on one side surface of the cabinet body 1, and the side surface where the retrieval window is located is perpendicular to the third direction.

For example, the retrieval window may be positioned near a side edge of the cabinet body 1, and the size of the retrieval window may be designed according to the size of the storage box 3, which will not be described in detail herein.

When in use, after the gripping structure 4 transfers the storage box 3 to the conveying structure 5, the second base 11 is moved to the retrieval window, the stage 12 is moved to protrude forward, so that the storage box 3 together with the stage 12 may protrude out from the retrieval window. After the storage box 3 is removed, the stage 12 is retracted.

If the storage box 3 needs to be stored into the cabinet body 1, the storage box 3 may be placed on the stage 12 through the retrieval window. After the stage 12 is retracted into the cabinet body 1, it is brought to the target height by the second base 11. At this time, the first gripper clamps the first clamping joint to remove the storage box 3 from the stage 12, and then the first base 9 is moved to move the storage box 3 to a position above the target position, the first gripper drives the storage box 3 to move downwards and inserts the second clamping joint into the support 8 at the target position on the lower storage rack 2.

It should be noted that the first direction mentioned in the above embodiments corresponds to the width direction of cabinet body 1, that is, the left-and-right direction. The second direction corresponds to the height direction of cabinet body 1, that is, the up-and-down direction. The third direction corresponds to the thickness direction of cabinet body 1, that is, the front-and-rear direction. For convenience of description, the clamping joint on the top side of the storage box 3 is named the first clamping joint, and the clamping joint on the bottom side of the storage box 3 is named the second clamping joint.

In summary, when compared with the vertical automatic storage cabinets in the prior art, the vertical automatic storage cabinet provided by the present invention has a reduced thickness, which is beneficial for reducing the occupied space; moreover, there is no need to sacrifice a lot of space in the cabinet body 1 to operate the manipulator, which improves the space utilization rate and practicability of the cabinet body 1.

Apparently, the foregoing embodiments are merely examples for clearly describing the present invention, and are not intended to limit the implementation ways thereof. For an ordinary person skilled in the art, other changes or modifications in different forms may be made on the basis of the above description. It is unnecessary and impossible to exhaustively list all the embodiments herein. Any obvious changes or modifications derived from this are still within the protection scope of the present invention.

The invention claimed is:

1. A vertical automatic storage cabinet, characterized in that, the vertical automatic storage cabinet comprises:
    a cabinet body;
    storage racks, provided in parallel and spaced apart in the cabinet body, each of the storage racks extends along a horizontal direction, and an area between two adjacent upper and lower storage racks forms a first transportation space;
    a storage box, detachably provided on each of the storage racks;
    a grasping structure, being movable along a first direction in the first transportation space, and being configured to grasp the storage box; wherein the first direction is parallel to an extension direction of the storage racks;
    a conveying structure, being movable along a second direction in the cabinet body, and being configured to carry the storage box and convey the storage box into or out of the cabinet body; wherein the second direction is parallel to a height direction of the cabinet body,
    the storage rack comprises a mounting plate and a support;
    the mounting plate is provided along the first direction, and the support is provided on one side of the mounting plate facing the grasping structure;
    one side of the storage box away from the grasping structure is provided with a first clamping joint pluggable to the support,
    an opposite side of the storage box facing the grasping structure is provided with a second clamping joint;

ends of a first gripper and a second gripper away from a first base are both provided with a clamping slot configured to be engaged with the second clamping joint to pull the first clamping joint out of the support or to insert the first clamping joint into the support.

2. The vertical automatic storage cabinet according to claim 1, characterized in that, the grasping structure comprises a first guide rail, a first base, a first gripper and a second gripper,
the first guide rail is provided along the first direction in the cabinet body, the first base is movable along the first direction on the first guide rail;
the first gripper and the second gripper are both provided on the first base, wherein the first gripper is provided opposite to the second gripper, the first gripper and the second gripper are respectively configured to grasp a storage box on different sides of the first base.

3. The vertical automatic storage cabinet according to claim 2, characterized in that, the grasping structure further comprises a first driving member, a second driving member and a third driving member,
a connecting part of the first driving member is connected with the first base, and an action part of the first driving member is connected with the first guide rail and is configured to drive the first base to move;
a connecting part of the second driving member is connected with the first base, and an action part of the second driving member is connected with the first gripper and is configured to drive the first gripper to move along the second direction;
a connecting part of the third driving member is connected with the first base, and an action part of the third driving member is connected with the second gripper and is configured to drive the second gripper to move along the second direction.

4. The vertical automatic storage cabinet according to claim 1, characterized in that, the conveying structure comprises a second guide rail, a second base and a stage,
a preset gap is reserved between one end of each of the storage racks and an inner wall of the cabinet body to form a second transportation space, the second guide rail is provided in the second transportation space, and the second guide rail extends along the second direction;
the second base is movable along the second direction on the second guide rail;
the stage is provided on one side of the second base away from the second guide rail and is movable along a third direction; wherein the third direction is perpendicular to both the first direction and the second direction.

5. The vertical automatic storage cabinet according to claim 4, characterized in that, the conveying structure further comprises a fourth driving member and a fifth driving member,
a connecting part of the fourth driving member is connected with the inner wall of the cabinet body, and an action part of the fourth driving member is connected with the second base and is configured to drive the second base to move;
a connecting part of the fifth driving member is connected with the second base, and an action part of the fifth driving member is connected with the stage and is configured to drive the stage to move along the third direction.

6. The vertical automatic storage cabinet according to claim 1, characterized in that,
each of the storage racks comprises two mounting plates provided in parallel and spaced apart, a plurality of the supports is provided on each of the mounting plates in a spaced apart manner, and the supports on the two mounting plates correspond to each other in a one-to-one manner.

7. The vertical automatic storage cabinet according to claim 1, characterized in that, the storage box comprises a box body and a shell,
a first snap-fit body is provided on an outer wall of the box body, and a second snap-fit body is provided on an inner wall of the shell, the first snap-fit body is configured to be snap-fitted with the second snap-fit body, so that the box body is detachably arranged in the shell;
the first clamping joint and the second clamping joint are both provided on an outer wall of the shell.

8. The vertical automatic storage cabinet according to claim 1, characterized in that,
a retrieval window is provided on one side surface of the cabinet body, and the side surface where the retrieval window is located is perpendicular to a third direction.

* * * * *